(12) United States Patent
Tian et al.

(10) Patent No.: US 11,758,088 B2
(45) Date of Patent: Sep. 12, 2023

(54) METHOD AND APPARATUS FOR ALIGNING PARAGRAPH AND VIDEO

(71) Applicants: Baidu.com Times Technology (Beijing) Co., Ltd., Beijing (CN); Baidu USA LLC, Sunnyvale, CA (US)

(72) Inventors: Hao Tian, Sunnyvale, CA (US); Xi Chen, Sunnyvale, CA (US); Jeff ChienYu Wang, Sunnyvale, CA (US); Daming Lu, Sunnyvale, CA (US)

(73) Assignees: Baidu.com Times Technology (Beijing) Co., Ltd., Beijing (CN); Baidu USA LLC, Sunnyvale, CA (US)

( * ) Notice: Subject to any disclaimer, the term of this patent is extended or adjusted under 35 U.S.C. 154(b) by 178 days.

(21) Appl. No.: 16/703,075

(22) Filed: Dec. 4, 2019

(65) Prior Publication Data

US 2020/0322570 A1    Oct. 8, 2020

(30) Foreign Application Priority Data

Apr. 8, 2019   (CN) .......................... 201910277787.9

(51) Int. Cl.
*H04N 7/025*  (2006.01)
*G06F 16/45*  (2019.01)

(52) U.S. Cl.
CPC ............. *H04N 7/025* (2013.01); *G06F 16/45* (2019.01)

(58) Field of Classification Search
None
See application file for complete search history.

(56) References Cited

U.S. PATENT DOCUMENTS

| | | | | |
|---|---|---|---|---|
| 5,689,585 A | * | 11/1997 | Bloomberg | G06K 9/00469 382/229 |
| 7,912,724 B1 | * | 3/2011 | Moorer | G10L 15/10 704/254 |

(Continued)

FOREIGN PATENT DOCUMENTS

| | | |
|---|---|---|
| JP | H09-237486 A | 9/1997 |
| JP | 2004-326404 A | 11/2004 |

(Continued)

OTHER PUBLICATIONS

Decision to Grant Patent received in Japanese Patent Application No. 2019-218381, dated Oct. 7, 2021 in 5 pages.

(Continued)

*Primary Examiner* — John W Miller
*Assistant Examiner* — Sean N. Haiem
(74) *Attorney, Agent, or Firm* — Knobbe, Martens, Olson & Bear, LLP

(57) ABSTRACT

Embodiments of the present disclosure provide a method and apparatus for aligning a paragraph and a video. The method may include: acquiring a commentary and a candidate material resource set corresponding to the commentary, a candidate material resource being a video or an image; acquiring a matching degree between each paragraph in the commentary and each candidate material resource in the candidate material resource set; and determining a candidate material resource sequence corresponding to the each paragraph in the commentary based on the matching degrees between the paragraphs in the commentary and the candidate material resources, playing durations of the candidate material resources and text lengths of the paragraphs in the commentary, an image playing duration being a preset image playing duration.

14 Claims, 6 Drawing Sheets

(56) References Cited

U.S. PATENT DOCUMENTS

| | | | |
|---|---|---|---|
| 10,362,349 B1* | 7/2019 | Chiarandini | G06K 9/00758 |
| 2002/0035475 A1* | 3/2002 | Yoda | G10L 15/24 |
| | | | 704/270 |
| 2009/0313245 A1* | 12/2009 | Weyl | G06F 16/5846 |
| 2011/0047163 A1* | 2/2011 | Chechik | G06F 16/70 |
| | | | 707/E17.071 |
| 2011/0066424 A1* | 3/2011 | Kurzweil | G06F 40/194 |
| | | | 704/E13.011 |
| 2012/0101965 A1* | 4/2012 | Hennig | G06N 7/005 |
| | | | 706/12 |
| 2014/0105571 A1* | 4/2014 | Chang | H04N 9/87 |
| | | | 386/241 |
| 2014/0163962 A1* | 6/2014 | Castelli | G06F 40/211 |
| | | | 704/9 |
| 2014/0369596 A1* | 12/2014 | Siskind | G06F 16/784 |
| | | | 382/158 |
| 2016/0004692 A1* | 1/2016 | Rogowski | G09G 5/246 |
| | | | 704/3 |
| 2016/0021334 A1* | 1/2016 | Rossano | H04N 5/9305 |
| | | | 704/2 |
| 2016/0247328 A1* | 8/2016 | Han | H04N 21/4394 |
| 2016/0350653 A1* | 12/2016 | Socher | G06N 5/04 |
| 2016/0358094 A1* | 12/2016 | Fan | G06F 16/3344 |
| 2017/0105571 A1 | 4/2017 | Davis | |
| 2017/0133038 A1* | 5/2017 | Jiang | G10L 15/187 |
| 2017/0289619 A1* | 10/2017 | Xu | H04N 21/251 |
| 2018/0082607 A1* | 3/2018 | Everding | G09B 5/06 |
| 2018/0089593 A1* | 3/2018 | Patel | G06F 8/71 |
| 2019/0012560 A1* | 1/2019 | Yamaguchi | G06K 9/4652 |
| 2019/0058609 A1* | 2/2019 | Cui | H04N 21/251 |
| 2020/0042837 A1* | 2/2020 | Skinner | G06K 9/627 |

FOREIGN PATENT DOCUMENTS

| | | |
|---|---|---|
| JP | 2007-274418 A | 10/2007 |
| JP | 2008-39845 A | 2/2008 |
| WO | WO 02/37841 A1 | 5/2002 |

OTHER PUBLICATIONS

Chinese Office Action dated Dec. 7, 2021 of Chinese Patent Application No. 201910277787.9. 7 pages.

* cited by examiner

METHOD AND APPARATUS FOR ALIGNING PARAGRAPH AND VIDEO

CROSS-REFERENCE TO RELATED APPLICATIONS

This application claims priority to Chinese Patent Application No. 201910277787.9, filed with the China National Intellectual Property Administration (CNIPA) on Apr. 8, 2019, the content of which is incorporated herein by reference in its entirety.

TECHNICAL FIELD

Embodiments of the present disclosure relate to the field of computer technology, and specifically to a method and apparatus for aligning a paragraph and a video.

BACKGROUND

With the development of network technology, all sorts of news throughout the world may be issued to users via various kinds of media. For a given news event, various kinds of media (such as a news website or a news application) will edit different news, and the news issued by different media will have different focuses to a certain extent, but various news reporting the given news event will also have more or less overlapped information.

The users may need to extract desired information only after reading a plurality of news reports, thus resulting in a low efficiency in acquiring news by the users. To help the users to improve the efficiency in acquiring news, a plurality of pieces of news of the given news event may be gathered, redundant information in the plurality of pieces of news may be removed, and a commentary directing to the news event may be extracted.

SUMMARY

Embodiments of the present disclosure provide a method and apparatus for aligning a paragraph with a video.

According to a first aspect, some embodiments of the present disclosure provide method for aligning a paragraph with a video, the method includes: acquiring a commentary and a candidate material resource set corresponding to the commentary, a candidate material resource being a video or an image; acquiring a matching degree between each paragraph in the commentary and each candidate material resource in the candidate material resource set; and determining a candidate material resource sequence corresponding to the each paragraph in the commentary based on matching degrees between paragraphs in the commentary and candidate material resources, playing durations of the candidate material resources and text lengths of the paragraphs in the commentary, an image playing duration being a preset image playing duration.

In some embodiments, the method further includes: generating a video corresponding to the commentary based on candidate material resource sequences corresponding to the paragraphs in the commentary.

In some embodiments, the method further includes: sending the video corresponding to the commentary to a terminal device, such that the terminal device presents the received video.

In some embodiments, the determining a candidate material resource sequence corresponding to the each paragraph in the commentary based on the matching degrees between paragraphs in the commentary and candidate material resources, playing durations of the candidate material resources and text lengths of the paragraphs in the commentary includes: for the each paragraph in the commentary, determining the candidate material resource sequence corresponding to the paragraph using a first preset optimization algorithm, with a playing duration of the candidate material resource sequence corresponding to the paragraph being equal to a playing duration corresponding to the paragraph as a constraint condition, with maximizing a matching degree between the candidate material resource sequence corresponding to the paragraph and the paragraph as an optimization target.

In some embodiments, the determining a candidate material resource sequence corresponding to the each paragraph in the commentary based on the matching degrees between paragraphs in the commentary and candidate material resources, playing durations of the candidate material resources and text lengths of the paragraphs in the commentary includes: determining candidate material resource sequences corresponding to the paragraphs in the commentary using a second preset optimization algorithm, with a playing duration of a candidate material resource sequence corresponding to a paragraph in the commentary being equal to the playing duration corresponding to the paragraph as a constraint condition, with maximizing a sum of matching degrees between candidate material resource sequences corresponding to the paragraphs in the commentary and the corresponding paragraphs as an optimization target.

In some embodiments, candidate material resources in the candidate material resource sequences corresponding to the paragraphs in the commentary are mutually different.

In some embodiments, the first preset optimization algorithm is a dynamic programming algorithm or a shortest path optimization algorithm.

In some embodiments, the second preset optimization algorithm is a dynamic programming algorithm or a shortest path optimization algorithm.

According to a second aspect, some embodiments of the present disclosure provide an apparatus for aligning a paragraph with a video, the apparatus includes: a first acquiring unit configured to acquire a commentary and a candidate material resource set corresponding to the commentary, a candidate material resource being a video or an image; a second acquiring unit configured to acquire a matching degree between each paragraph in the commentary and each candidate material resource in the candidate material resource set; and a determining unit configured to determine a candidate material resource sequence corresponding to the each paragraph in the commentary based on matching degrees between paragraphs in the commentary and the candidate material resources, playing durations of the candidate material resources and text lengths of the paragraphs in the commentary, an image playing duration being a preset image playing duration.

In some embodiments, the apparatus further includes: a video generating unit configured to generate a video corresponding to the commentary based on candidate material resource sequences corresponding to the paragraphs in the commentary.

In some embodiments, the apparatus further includes: a video sending unit configured to send the video corresponding to the commentary to a terminal device, such that the terminal device presents the received video.

In some embodiments, the determining unit is further configured to: for the each paragraph in the commentary, determine the candidate material resource sequence corresponding to the paragraph using a first preset optimization algorithm, with a playing duration of the candidate material resource sequence corresponding to the paragraph being equal to a playing duration corresponding to the paragraph as a constraint condition, with maximizing a matching degree between the candidate material resource sequence corresponding to the paragraph and the paragraph as an optimization target.

In some embodiments, the determining unit is further configured to: determine candidate material resource sequences corresponding to the paragraphs in the commentary using a second preset optimization algorithm, with a playing duration of a candidate material resource sequence corresponding to a paragraph in the commentary being equal to the playing duration corresponding to the paragraph as a constraint condition, with maximizing a sum of matching degrees between candidate material resource sequences corresponding to the paragraphs in the commentary and the corresponding paragraphs as an optimization target.

In some embodiments, candidate material resources in the candidate material resource sequences corresponding to the paragraphs in the commentary are mutually different.

In some embodiments, the first preset optimization algorithm is a dynamic programming algorithm or a shortest path optimization algorithm.

In some embodiments, the second preset optimization algorithm is a dynamic programming algorithm or a shortest path optimization algorithm.

According to a third aspect, some embodiments of the present disclosure provide a server, including: one or more processors; and a storage apparatus, storing one or more programs thereon, where the one or more programs, when executed by the one or more processors, cause the one or more processors to implement the method according to any one of the implementations of the first aspect.

According to a fourth aspect, some embodiments of the present disclosure provide a computer readable storage medium, storing a computer program thereon, wherein the computer program, when executed by one or more processors, implements the method according to any one of the implementations of the first aspect.

According to a fifth aspect, some embodiments of the present disclosure provide another server, including: an interface; a memory, storing one or more programs thereon; and one or more processors operably connected to the interface and the memory for: acquiring a commentary and a candidate material resource set corresponding to the commentary, a candidate material resource being a video or an image; acquiring a matching degree between each paragraph in the commentary and each candidate material resource in the candidate material resource set; and determining a candidate material resource sequence corresponding to each paragraph in the commentary based on the matching degrees between paragraphs in the commentary and candidate material resources, playing durations of candidate material resources and text lengths of paragraphs in the commentary, an image playing duration being a preset image playing duration.

According to a sixth aspect, some embodiments of the present disclosure provide a computer readable medium, storing a computer program thereon, wherein the computer program, when executed by one or more processors, cause the one or more processors to perform operations: acquiring a commentary and a candidate material resource set corresponding to the commentary, a candidate material resource being a video or an image; acquiring a matching degree between each paragraph in the commentary and each candidate material resource in the candidate material resource set; and determining a candidate material resource sequence corresponding to each paragraph in the commentary based on the matching degrees between paragraphs in the commentary and candidate material resources, playing durations of candidate material resources and text lengths of paragraphs in the commentary, an image playing duration being a preset image playing duration.

To improve the users' efficiency in acquiring news, the existing technologies will often generate a commentary for a news cluster, the users need to read the commentary in a literal form to acquire a news abstract, and no corresponding video is generated for the commentary. However, the method and apparatus for aligning a paragraph with a video according to embodiments of the present disclosure acquire a commentary and a candidate material resource set corresponding to the commentary, a candidate material resource being the video or an image, acquire a matching degree between each paragraph in the commentary and each candidate material resource in the candidate material resource set, and determine a candidate material resource sequence corresponding to each paragraph in the commentary based on the matching degrees between paragraphs in the commentary and candidate material resources, playing durations of candidate material resources and text lengths of paragraphs in the commentary, an image playing duration being a preset image playing duration, thus providing data sources for subsequently generating the video corresponding to the commentary based on the candidate material resource sequences corresponding to paragraphs in the commentary, and further improving the matching degree between the subsequently generated video corresponding to the commentary and the commentary.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
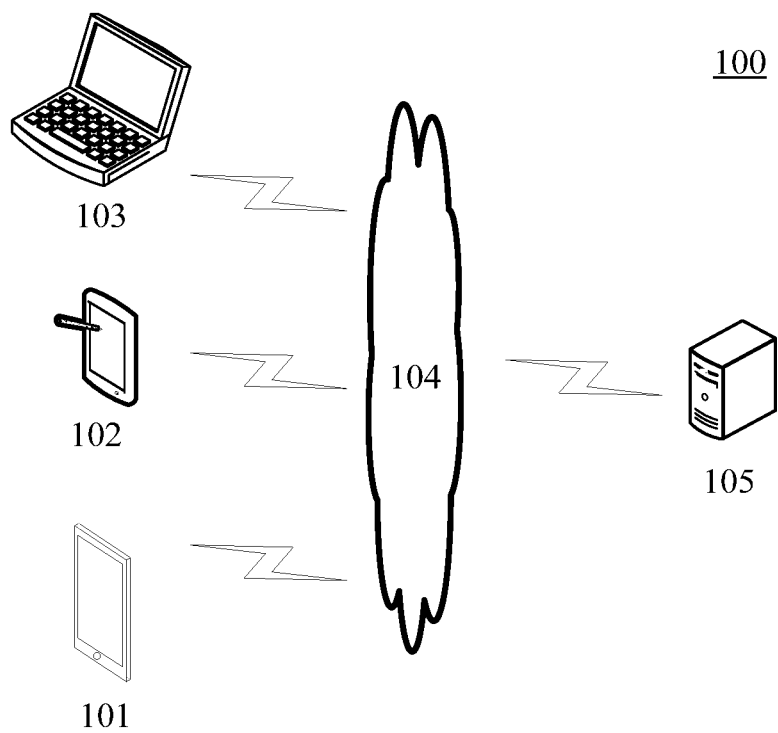
FIG. 1 is a diagram of an example system architecture in which some embodiments of the present disclosure may be implemented.

FIG. 1 shows an example system architecture 100 in which a method for aligning a paragraph with a video or an apparatus for aligning a paragraph with a video of embodiments of the present disclosure may be implemented.

As shown in FIG. 1, the system architecture 100 may include terminal devices 101, 102, and 103, a network 104, and a server 105. The network 104 serves as a medium providing a communication link between the terminal devices 101, 102, or 103, and the server 105. The network 104 may include various types of connections, such as wired or wireless communication links, or optical cables.

A user may interact with the server 105 using the terminal devices 101, 102, or 103 via the network 104, e.g., to receive or send a message. The terminal devices 101, 102, and 103 may be provided with various communication client applications, such as a web browser application, a shopping application, a search application, an instant messaging tool, an email client, and social platform software.

The terminal devices 101, 102, and 103 may be hardware or software. When the terminal devices 101, 102 and 103 are hardware, the terminal devices may be various electronic devices having a display screen, including but not limited to a smart phone, a tablet computer, an e-book reader, an MP3 (Moving Picture Experts Group Audio Layer III) player, an MP4 (Moving Picture Experts Group Audio Layer IV) player, a laptop portable computer, a desktop computer, and the like. When the terminal devices 101, 102, and 103 are software, the terminal devices may be installed in the above-listed electronic devices, or be implemented as a plurality of software programs or software modules, or be implemented as a single software program or software module. This is not specifically limited here.

The server 105 may be a server providing various services, such as a back-end website server providing support for a news website displayed on the terminal devices 101, 102, and 103. The back-end website server may process, e.g., analyze, data such as a received news page request, and return the processing result (e.g., page data of a news webpage) to the terminal devices.

It should be noted that the method for aligning a paragraph and a video according to some embodiments of the present disclosure is generally executed by the server 105. Accordingly, the apparatus for aligning a paragraph and a video is generally provided in the server 105.

It should be noted that the server 105 may be hardware or software. When the server 105 is hardware, the server may be implemented as a distributed server cluster composed of a plurality of servers, or be implemented as a single server. When the server 105 is software, the server may be implemented as a plurality of software programs or software modules (e.g., software programs or software modules for providing page services of the news webpage), or may be implemented as a single software program or software module. This is not specifically limited here.

It should be understood that the numbers of terminal devices, networks, and servers in FIG. 1 are merely illustrative. Any number of terminal devices, networks, and servers may be provided based on actual requirements.

Figure 2:
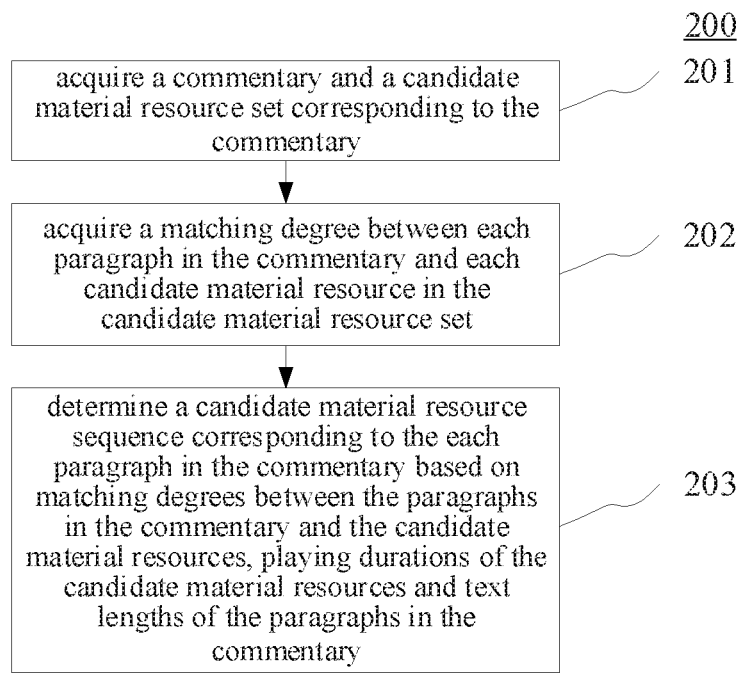
FIG. 2 is a flowchart of a method for aligning a paragraph with a video according to an embodiment of the present disclosure.

Further referring to FIG. 2, a process 200 of a method for aligning a paragraph with a video according to an embodiment of the present disclosure is shown. The method for aligning a paragraph with a video includes the following steps:

Step 201: acquiring a commentary and a candidate material resource set corresponding to the commentary.

In the present embodiment, an executing body (e.g., the server 105 shown in FIG. 1) of the method of aligning a paragraph with a video may acquire the commentary and the candidate material resource set corresponding to the commentary locally or remotely from other electronic devices connected to the executing body via a network.

Here, the commentary may include at least one paragraph. The commentary may be direct to one event or one topic.

For example, the commentary may direct to a given news event. Here, the news event refers to an event taking place within a recent first preset duration (e.g., within three months). As an example, a commentary describing a news event may be a text obtained by abstracting the text part of a piece of news direct to the news event. Here, the news may be electronic data directing to the news event in various forms. The news may include at least one of the following items: a text, an image, an audio, or a video. For example, the news may be a webpage, or various documents. The document may include at least one of the following items: a text, an image, an audio, or a video. The news may further be merely a text, an image, or a video.

Here, the candidate material resource set corresponding to the commentary stores videos or images related to a news event or topic to which the commentary directs. The candidate material resource set corresponding to the commentary may be obtained by various implementations.

For example, when the commentary directs to a news event E, then the candidate material resource set corresponding to the commentary may be composed of various videos and images included in a news cluster C directing to the news event E. Here, the news cluster C includes at least one piece of news, where each piece of news directs to the news event E.

As another example, when the commentary directs to the news event E, then the candidate material resource set corresponding the commentary may be obtained through the following operations.

First, at least one video segment is obtained by semantically segmenting videos in pieces of news included in the news cluster C directing to the news event E, the obtained video segments are determined for being used as a target video set.

Then, the target video set and a target image set are combined to obtain the candidate material resource set corresponding to the commentary, where the target image set is composed of various images included in the news cluster C directing to the news event.

Step 202: acquiring a matching degree between each paragraph in the commentary and each candidate material resource in the candidate material resource set.

In the present embodiment, the matching degree between each paragraph in the commentary and each candidate material resource in the candidate material resource set may be obtained by the executing body through calculating by various implementations. Thus, the executing body may acquire the matching degree between each paragraph in the commentary and each candidate material resource in the candidate material resource set.

In the present embodiment, the matching degree between each paragraph in the commentary and each candidate material resource in the candidate material resource set may also be obtained by the other electronic devices connected to the executing body via the network through calculating by various implementations. Thus, the executing body may acquire the matching degree between each paragraph in the commentary and each candidate material resource in the candidate material resource set remotely from the other electronic devices connected to the executing body via the network.

Specifically, since the candidate material resource may be a video or image, here, a matching degree between each paragraph in the commentary and a video in the candidate material resource set may be calculated using various methods of calculating a matching degree between a text and a video, and a matching degree between each paragraph in the commentary and an image in the candidate material resource set may be calculated using various methods of calculating a matching degree between a text and an image. This is not specifically limited herein.

Step 203: determining a candidate material resource sequence corresponding to the each paragraph in the commentary based on matching degrees between paragraphs in the commentary and candidate material resources, playing durations of the candidate material resources and text lengths of the paragraphs in the commentary.

In the present embodiment, the executing body may determine the candidate material resource sequence corresponding to each paragraph in the commentary based on the matching degrees between paragraphs in the commentary and candidate material resources, the playing durations of candidate material resources and the text lengths of paragraphs in the commentary by various implementations. An image playing duration is a preset image playing duration.

It should be noted that, here, the playing duration of a candidate material resource of video type is an inherent attribute of the candidate material resource of video type, and is constant. For a candidate material resource of image type, here, a playing duration of each candidate material resource of image type is set as a constant preset image playing duration (e. g., 3 seconds). Thus, all candidate material resources may have a constant playing duration attribute.

In some alternative implementations of the present embodiment, step 203 may be performed as follows:

For each paragraph in the commentary, the candidate material resource sequence corresponding to the paragraph is determined using a first preset optimization algorithm, with a playing duration of the candidate material resource sequence corresponding to the paragraph being equal to the playing duration corresponding to the paragraph as a constraint condition, with maximizing the matching degree between the candidate material resource sequence corresponding to the paragraph and the paragraph as an optimization target.

That is, respectively for each paragraph in the commentary, sequentially arranged candidate material resources are selected from the candidate material resource set acquired in step 202 to form the candidate material resource sequence corresponding to the paragraph, and the playing duration of the selected candidate material resource sequence corresponding to the paragraph is equal to the playing duration corresponding to the paragraph.

Here, the playing duration of the candidate material resource sequence is a sum of the playing durations of the respective candidate material resources in the candidate material resource sequence. The playing duration corresponding to the paragraph is determined by the number of words in the paragraph and a preset speech rate. For example, the preset speech rate is N words per second, the number of words in the paragraph is M, and then the playing duration corresponding to the paragraph is L second, where L is a ratio obtained by dividing M by N.

Here, the first preset optimization algorithm may be various optimization algorithms with a constraint condition and an optimization target. For example, the first preset optimization algorithm may include, but is not limited to: a dynamic programming algorithm and a shortest path optimization algorithm.

In some alternative implementations of the present embodiment, step 203 may also be performed as follows:

determining candidate material resource sequences corresponding to paragraphs in the commentary using a second preset optimization algorithm, with a playing duration of a candidate material resource sequence corresponding to a paragraph in the commentary being equal to the playing duration corresponding to the paragraph as a constraint condition, with maximizing a sum of matching degrees between candidate material resource sequences corresponding to the paragraphs in the commentary and the corresponding paragraphs as an optimization target.

Compared with the above alternative implementations, the optimization target here may be different from the optimization target of the above alternative implementations. In the above alternative implementations, each of the paragraphs is optimized respectively and with maximizing the matching degree between a paragraph and the candidate material resource sequence corresponding to the paragraph as an optimization target. Moreover, the alternative implementation here optimizes the paragraphs in the commentary as a whole with maximizing the sum of the matching degrees between the candidate material resource sequences corresponding to paragraphs in the commentary and the corresponding paragraphs as the optimization target.

Here, the second preset optimization algorithm may further be various optimization algorithms with a constraint condition and an optimization target. For example, the second preset optimization algorithm may include, but is not limited to: a dynamic programming algorithm and a shortest path optimization algorithm.

In some alternative implementations of the present embodiment, candidate material resources in the candidate material resource sequences corresponding to the paragraphs in the commentary determined in step 203 may be mutually different. Thus, repeating images or videos will not occur in subsequently corresponding video generated for the commentary, and readability and vividness of the generated video may be increased. It will be appreciated that if the candidate material resources in the candidate material resource sequences corresponding to the paragraphs determined in step 203 are mutually different, then the constraint condition of that the candidate material resources in the candidate material resource sequences corresponding to the paragraphs in the commentary are mutually different may be added to the constraint condition in the above two alternative implementations.

Figure 3:
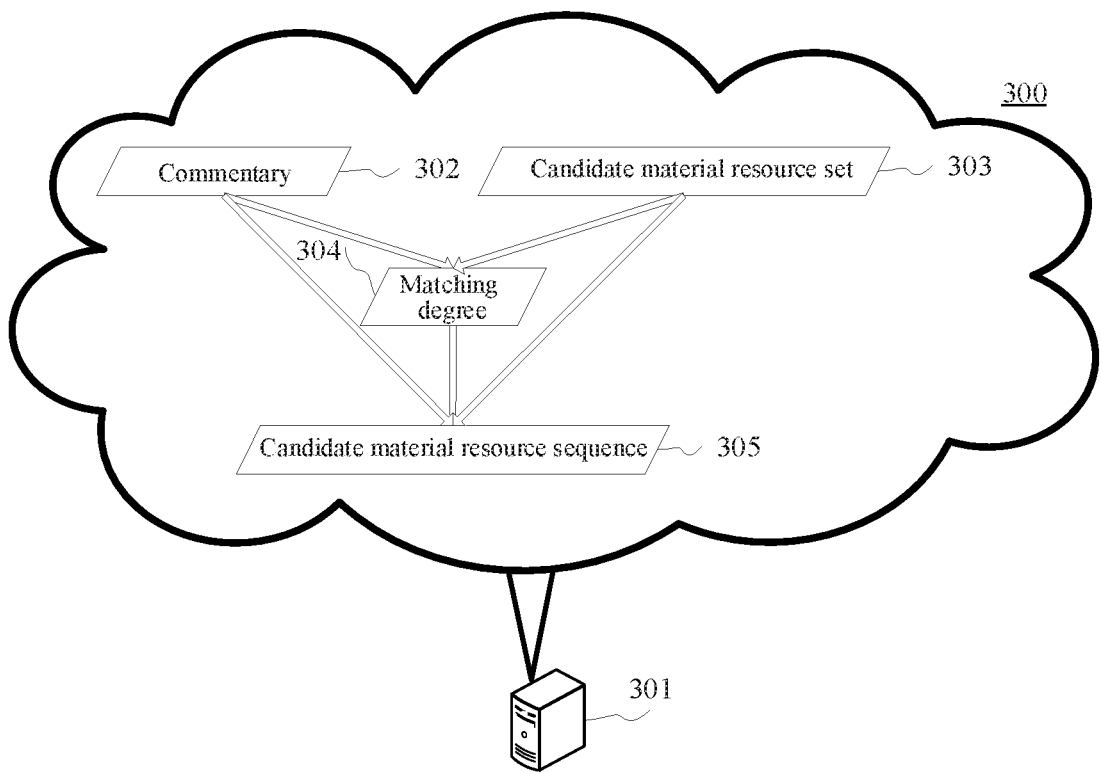
FIG. 3 is a schematic diagram of an application scenario of the method for aligning a paragraph and a video according to an embodiment of the present disclosure.

Further referring to FIG. 3, FIG. 3 is a schematic diagram of an application scenario of the method for aligning a paragraph with a video according to the present embodiment. In the application scenario of FIG. 3, a server 301 providing support for a news website may first acquire a commentary 302 and a candidate material resource set 303 corresponding to the commentary 302. Then, the server 301 may acquire matching degrees 304 between paragraphs in the commentary 302 and candidate material resources in the candidate material resource set 303. Finally, the server 301 may determine candidate material resource sequences 305 corresponding to paragraphs in the commentary 302 based on the matching degrees 304 between paragraphs in the commentary 302 and candidate material resources in the candidate material resource set 303, playing durations of candidate material resources and text lengths of paragraphs in the commentary.

The method according to the above embodiments of the present disclosure acquires a commentary and a candidate material resource set corresponding to the commentary, a candidate material resource being a video or an image, acquires a matching degree between each paragraph in the commentary and each candidate material resource in the candidate material resource set, and determines candidate material resource sequences corresponding to paragraphs in the commentary based on the matching degrees between paragraphs in the commentary and candidate material resources, playing durations of candidate material resources and text lengths of paragraphs in the commentary, an image playing duration being a preset image playing duration, thus providing data sources for subsequently generating a video corresponding to the commentary based on the candidate material resource sequences corresponding to the paragraphs in the commentary, and further improving the matching degree between the subsequently generated video corresponding to the commentary and the commentary.

Figure 4A:
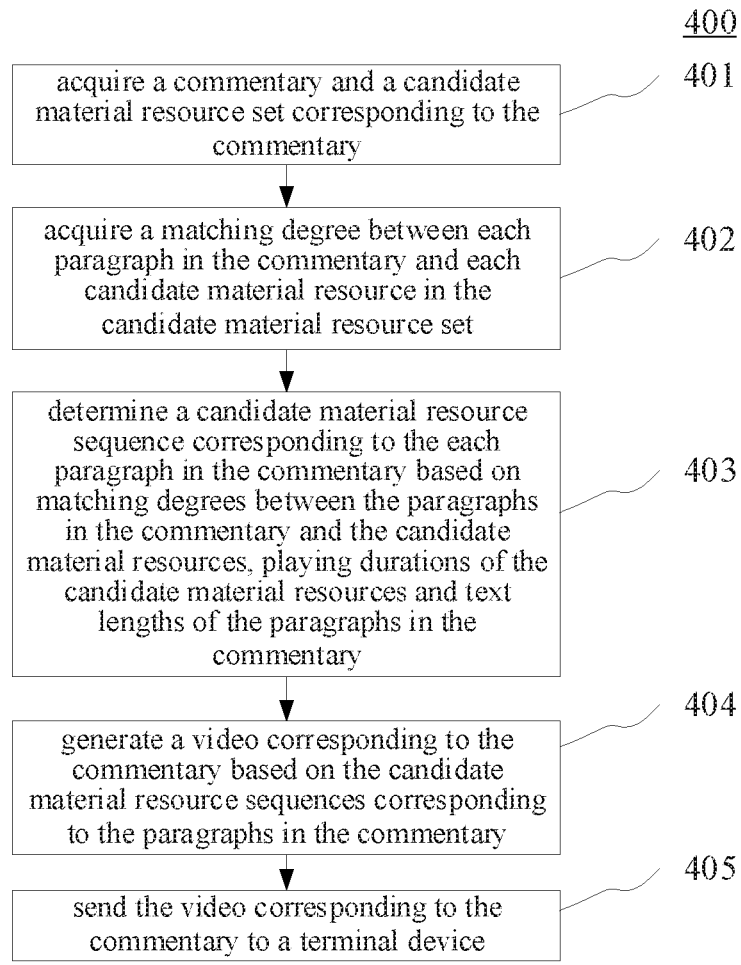
FIG. 4A is a flowchart of the method for aligning a paragraph and a video according to another embodiment of the present disclosure.

Further referring to FIG. 4A, a process 400 of the method for aligning a paragraph with a video according to another embodiment is shown. The process 400 of the method for aligning a paragraph with a video includes the following steps:

Step 401: acquiring a commentary and a candidate material resource set corresponding to the commentary.

Step 402: acquiring a matching degree between each paragraph in the commentary and each candidate material resource in the candidate material resource set.

Step 403: determining a candidate material resource sequence corresponding to the each paragraph in the commentary based on the matching degrees between the paragraphs in the commentary and the candidate material resources, playing durations of the candidate material resources and text lengths of the paragraphs in the commentary.

Specific operations of step 401, step 402, and step 403 in the present embodiment are basically identical to the operations of step 201, step 202, and step 203 in the embodiment shown in FIG. 2. The description will not be repeated here.

Step 404: generating a video corresponding to the commentary based on the candidate material resource sequences corresponding to the paragraphs in the commentary.

In the present embodiment, the executing body may generate the video corresponding to the commentary based on the candidate material resource sequences corresponding to the paragraphs in the commentary determined in step 403.

Figure 4B:
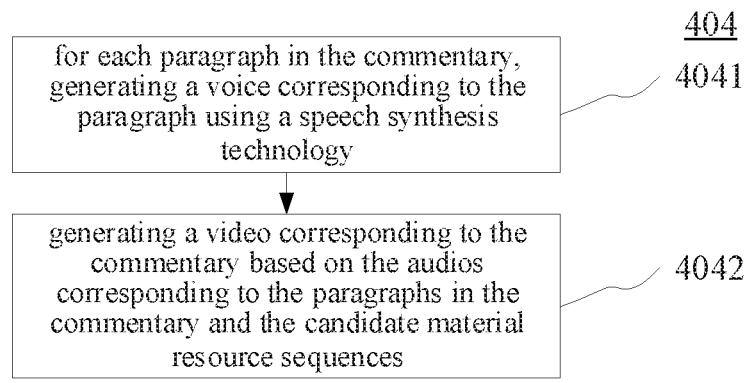
FIG. 4B is an exploded flowchart of step 404 according to an embodiment of the present disclosure.

In some alternative implementations of the present embodiment, step 404 may include step 4041 and step 4042 shown in FIG. 4B. Referring to FIG. 4B, an exploded flowchart of step 404 according to an embodiment of the present disclosure is shown.

Step 4041: for each paragraph in the commentary, generating an audio corresponding to the paragraph using a speech synthesis technology.

It should be noted that the speech synthesis technology is an existing technology that is widely researched and applied at present. The description will not be repeated here.

Step 4042: generating a video corresponding to the commentary based on the audios corresponding to the paragraphs in the commentary and the candidate material resource sequences.

In some implementations, step 4042 may be performed as follows:

First, the audios corresponding to the paragraphs may be connected according to the front to rear order of paragraphs in the commentary, to obtain a first audio.

Then, a video corresponding to paragraphs may be connected according to the front to rear order of paragraphs in the commentary, to obtain a first video.

Here, a video corresponding to a paragraph is a video obtained by sequentially connecting the candidate material resources in the candidate material resource sequence corresponding to the paragraph.

Finally, the obtained first audio and first video are determined for use as an audio part and a video part of the video corresponding to the commentary respectively.

Figure 4C:
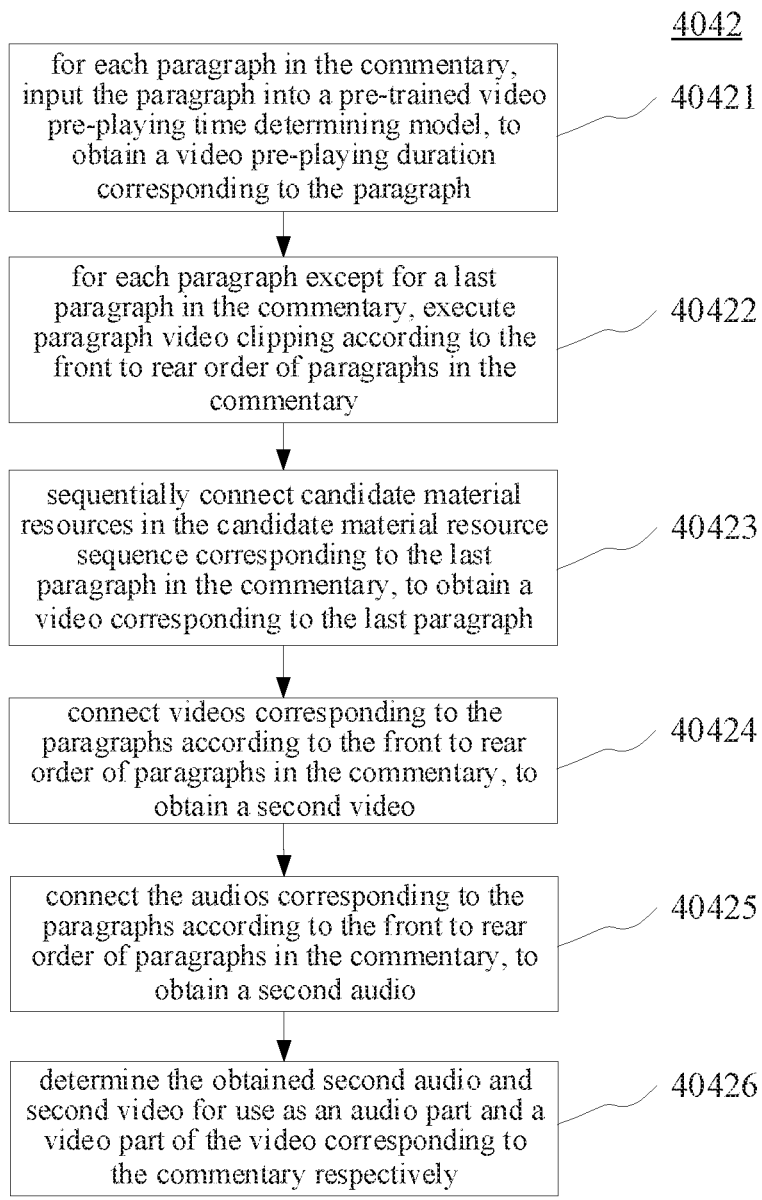
FIG. 4C is an exploded flowchart of step 4042 according to an embodiment of the present disclosure.

In some implementations, step 4042 may further include step 40421 to step 40426 shown in FIG. 4C. Referring to FIG. 4C, an exploded flowchart of step 4042 according to an embodiment of the present disclosure is shown.

Step 40421: for each paragraph in the commentary, inputting the paragraph into a pre-trained video pre-playing time determining model, to obtain a video pre-playing duration corresponding to the paragraph.

Here, the video pre-playing duration determining model is used for characterizing a corresponding relationship between a text and a video pre-playing duration corresponding to the text.

In practice, a manually clipped news video usually has been played for a short period of time before a host speaks. In order to make the video generated for the commentary be more in line with human watching habits, and be more like the manually clipped news video, the video pre-playing time determining model may be trained based on a large number of training samples using a machine learning algorithm. The training samples here may include a text included in a sample news video and an annotated duration of a video in the sample news video prior to a commentary audio.

Step 40422: for each paragraph except for a last paragraph in the commentary, executing paragraph video clipping according to the front to rear order of paragraphs in the commentary.

Here, the paragraph video clipping may include the following operations:

First, the video pre-playing duration corresponding to a paragraph next to the paragraph is determined for use as a video clipping duration.

Second, candidate material resources in the candidate material resource sequence corresponding to the paragraph are sequentially connected, to obtain the video corresponding to the paragraph.

Third, a video of the video clipping duration at a tail of the video corresponding to the paragraph is clipped.

That is, this scheme pre-plays a video corresponding to a paragraph except for a first paragraph in the commentary, and overwrites a tail of a video of a paragraph preceding the paragraph. The video pre-playing and video overwriting duration is the video pre-playing duration corresponding to the paragraph determined in step 40421.

Step 40423: sequentially connecting candidate material resources in the candidate material resource sequence corresponding to the last paragraph in the commentary, to obtain a video corresponding to the last paragraph.

Step 40424: connecting videos corresponding to the paragraphs according to the front to rear order of paragraphs in the commentary, to obtain a second video.

Step 40425: connecting the audios corresponding to the paragraphs according to the front to rear order of paragraphs in the commentary, to obtain a second audio.

Step 40426: determining the obtained second audio and second video for use as an audio part and a video part of the video corresponding to the commentary respectively.

Figure 4D:
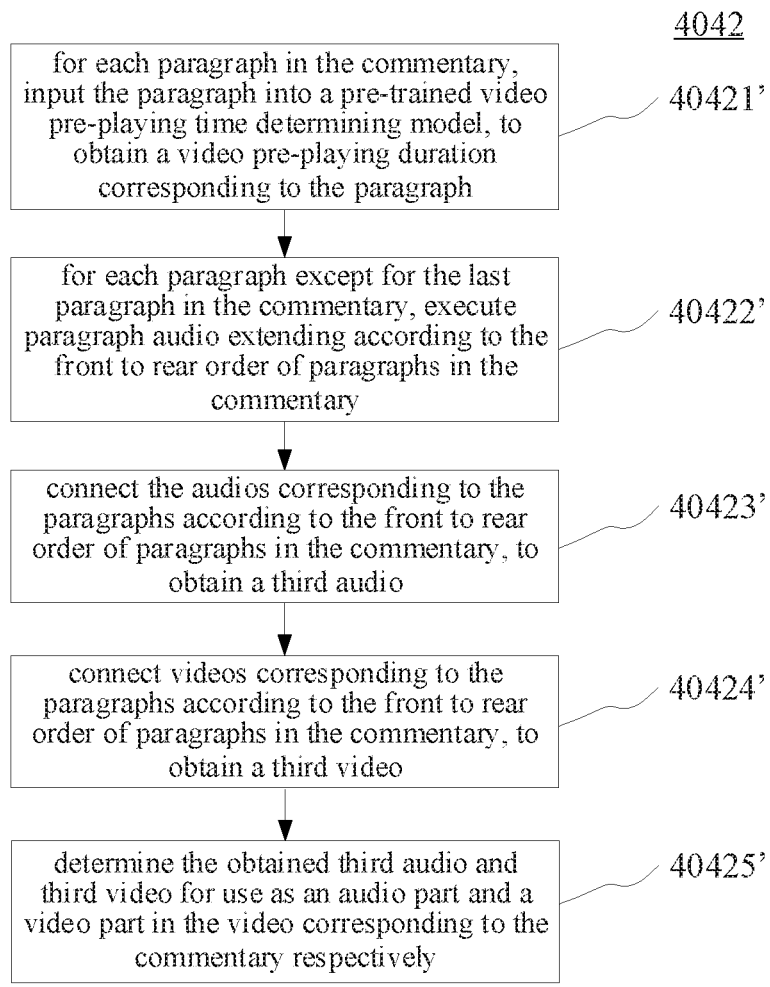
FIG. 4D is an exploded flowchart of step 4042 according to another embodiment of the present disclosure.

In some implementations, step 4042 may further include step 40421' to step 40425' shown in FIG. 4D. Referring to FIG. 4D, an exploded flowchart of step 4042 according to another embodiment of the present disclosure is shown.

Step 40421': for each paragraph in the commentary, inputting the paragraph into a pre-trained video pre-playing time determining model, to obtain a video pre-playing duration corresponding to the paragraph.

Here, specific operations of step 40421' are basically identical to the operations of step 40421. The description will not be repeated here.

Step 40422': for each paragraph except for the last paragraph in the commentary, executing paragraph audio extending according to the front to rear order of paragraphs in the commentary.

Here, the paragraph audio extending may include the following operations:

First, the video pre-playing duration corresponding to a paragraph next to the paragraph is determined for use as an audio extending duration.

Second, a silence playing duration of the determined audio extending duration is added to a tail of the audio corresponding to the paragraph.

That is, this scheme pre-plays the video corresponding to each paragraph except for the first paragraph in the commentary, and adds a silence playing duration to a tail of an audio of a paragraph preceding the paragraph. The video pre-playing and audio extending duration is the video pre-playing duration corresponding to the paragraph determined in step 40421'.

Step 40423': connecting the audios corresponding to the paragraphs according to the front to rear order of paragraphs in the commentary, to obtain a third audio.

Step 40424': connecting videos corresponding to the paragraphs according to the front to rear order of paragraphs in the commentary, to obtain a third video.

Here, a video corresponding to a paragraph is a video obtained by sequentially connecting the candidate material resources in the candidate material resource sequence corresponding to the paragraph.

Step 40425': determining the obtained third audio and third video for use as an audio part and a video part in the video corresponding to the commentary respectively.

Step 405: sending the video corresponding to the commentary to a terminal device.

In the present embodiment, the executing body may send the video corresponding to the commentary generated in step 404 to the terminal device. Here, the terminal device may be the electronic device connected to the executing body via the network. Thus, the terminal device may, in response to receiving the video sent by the executing body, present the received video, thus further achieving presenting the video corresponding to the commentary on the terminal device. If the commentary directs to the news event E, then presenting the video corresponding to the commentary of the news cluster C which directs to the news event E on the terminal device may be achieved. The user may quickly know about the news event E by watching the presented video corresponding to the commentary of the news cluster C which directs to the news event E on the terminal device, without the need for knowing about the news event E to which the news cluster C direct by the user by reading texts, thereby improving the user's efficiency in acquiring news event information.

As can be seen from FIG. 4A, compared with the corresponding embodiments of FIG. 2, the process 400 of the method for aligning a paragraph with a video in the present embodiment additionally provides the steps of generating a video corresponding to the commentary, and sending the video corresponding to the commentary to the terminal device. Accordingly, the scheme described in the present embodiment may present the video corresponding to the commentary on the terminal device. Users may watch the video corresponding to the commentary on the terminal device, thus further extending the information presenting function of the terminal device.

Figure 5:
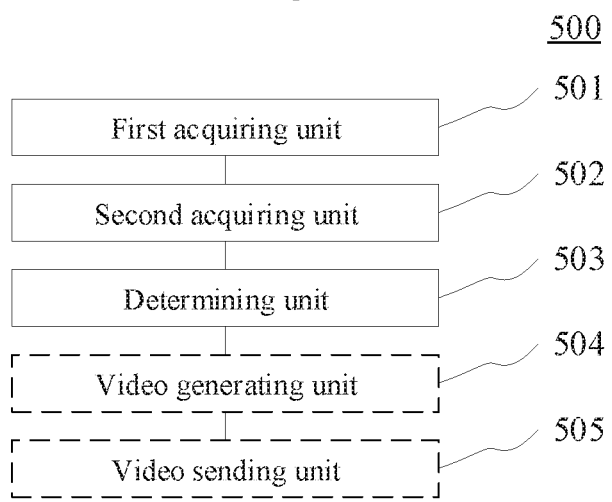
FIG. 5 is a schematic structural diagram of an apparatus for aligning a paragraph and a video according to an embodiment of the present disclosure.

Further referring to FIG. 5, as an implementation of the method shown in the above figures, an embodiment of the present disclosure provides an apparatus for aligning a paragraph with a video. The embodiment of the apparatus corresponds to the embodiment of the method shown in FIG. 2. The apparatus may be specifically applied to various electronic devices.

As shown in FIG. 5, the apparatus 500 for aligning a paragraph with a video of the present embodiment includes: a first acquiring unit 501, a second acquiring unit 502, and a determining unit 503. The first acquiring unit 501 is configured to acquire a commentary and a candidate material resource set corresponding to the commentary, a candidate material resource being a video or an image; the second acquiring unit 502 is configured to acquire a matching degree between each paragraph in the commentary and each candidate material resource in the candidate material resource set; and the determining unit 503 is configured to determine a candidate material resource sequence corresponding to each paragraph in the commentary based on matching degrees between paragraphs in the commentary and the candidate material resources, playing durations of the candidate material resources and text lengths of paragraphs in the commentary, an image playing duration being a preset image playing duration.

The related description of step 201, step 202, and step 203 in the corresponding embodiment of FIG. 2 may be referred to respectively for specific processing of the first acquiring unit 501, the second acquiring unit 502, and the determining unit 503 of the apparatus 500 for aligning a paragraph with a video and the technical effects thereof in the present embodiment. The description will not be repeated here.

In some alternative implementations of the present embodiment, the apparatus 500 may further include: a video generating unit 504 configured to generate a video corresponding to the commentary based on candidate material resource sequences corresponding to paragraphs in the commentary.

In some alternative implementations of the present embodiment, the apparatus 500 may further include: a video sending unit 505 configured to send the video corresponding to the commentary to a terminal device, such that the terminal device presents the received video.

In some alternative implementations of the present embodiment, the determining unit 503 may be further configured to: for each paragraph in the commentary, determine the candidate material resource sequence corresponding to the paragraph using a first preset optimization algorithm, with a playing duration of the candidate material resource sequence corresponding to the paragraph being equal to a playing duration corresponding to the paragraph as a constraint condition, with maximizing a matching degree between the candidate material resource sequence corresponding to the paragraph and the paragraph as an optimization target.

In some alternative implementations of the present embodiment, the determining unit 503 may be further configured to: determine candidate material resource sequences corresponding to paragraphs in the commentary using a second preset optimization algorithm, with a playing duration of a candidate material resource sequence corresponding to a paragraph in the commentary being equal to the playing duration corresponding to the paragraph as a constraint condition, with maximizing a sum of matching degrees between candidate material resource sequences corresponding to paragraphs in the commentary and the corresponding paragraphs as an optimization target.

In some alternative implementations of the present embodiment, candidate material resources in the candidate material resource sequences corresponding to paragraphs in the commentary may be mutually different.

In some alternative implementations of the present embodiment, the first preset optimization algorithm may be a dynamic programming algorithm or a shortest path optimization algorithm.

In some alternative implementations of the present embodiment, the second preset optimization algorithm may be a dynamic programming algorithm or a shortest path optimization algorithm.

It should be noted that the description of other embodiments in the present disclosure may be referred to for implementation details and technical effects of the units in the apparatus for aligning a paragraph with a video according to some embodiments of the present disclosure. The description will not be repeated here.

Figure 6:
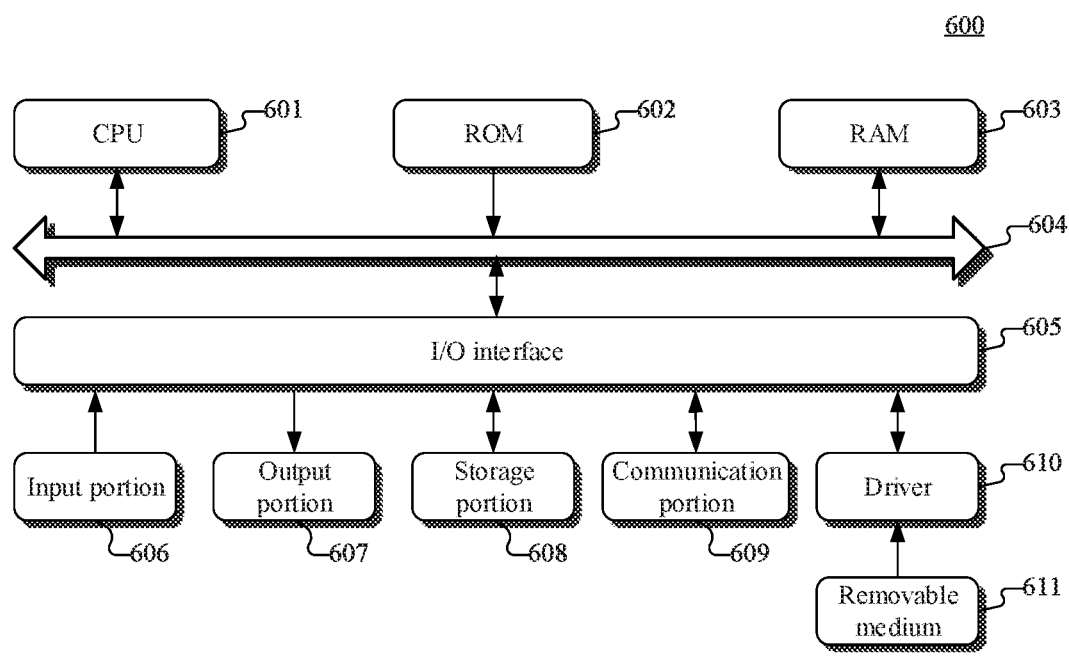
FIG. 6 is a schematic structural diagram of a computer system adapted to implement a server of some embodiments of the present disclosure.

Referring to FIG. 6 below, a schematic structural diagram of a computer system 600 adapted to implement a server of some embodiments of the present disclosure is shown. The server shown in FIG. 6 is merely an example, and should not limit the functions and scope of use of some embodiments of the present disclosure.

As shown in FIG. 6, the computer system 600 includes one or more central processing units (CPU) 601, which may execute various appropriate actions and processes in accordance with a program stored in a read only memory (ROM) 602 or a program loaded into a random access memory (RAM) 603 from a storage portion 608. The RAM 603 further stores various programs and data required by operations of the system 600. The CPU 601, the ROM 602, and the RAM 603 are connected to each other through a bus 604. An input/output (I/O) interface 605 is also connected to the bus 604.

The following components are connected to the I/O interface 605: an input portion 606 including a keyboard, a mouse, or the like; an output portion 607 including a cathode ray tube (CRT), a liquid crystal display device (LCD), a speaker, or the like; a storage portion 608 including a hard disk, or the like;

and a communication portion 609 including a network interface card, such as a LAN (local area network) card and a modem. The communication portion 609 performs communication processing via a network, such as the Internet. A driver 610 is also connected to the I/O interface 605 as required. A removable medium 611, such as a magnetic disk, an optical disk, a magneto-optical disk, and a semiconductor memory, may be installed on the driver 610 as required, such that a computer program read therefrom is installed in the storage portion 608 as needed.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 609, or may be installed from the removable medium 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising: a processor including a first acquiring unit, a second acquiring unit, and a determining unit. The names of the units do not constitute a limitation to such units themselves in some cases. For example, the first acquiring unit may be further described as "a unit configured to acquire a commentary and a candidate material resource set corresponding to the commentary."

In another aspect, some embodiments of the present disclosure further provide a computer readable medium. The computer readable medium may be included in the apparatus described in the above embodiments, or a stand-alone computer readable medium without being assembled into the apparatus. The computer readable medium stores one or more programs. The one or more programs, when executed by the apparatus, cause the apparatus to: acquire a commentary and a candidate material resource set corresponding to the commentary, a candidate material resource being a video or an image; acquire a matching degree between each paragraph in the commentary and each candidate material resource in the candidate material resource set; and determine a candidate material resource sequence corresponding to each paragraph in the commentary based on the matching degrees between paragraphs in the commentary and the candidate material resources, playing durations of the candidate material resources and text lengths of paragraphs in the commentary, an image playing duration being a preset image playing duration.

In still another aspect, some embodiments of the present disclosure further provide another server, including: an interface; a memory, storing one or more programs thereon; and one or more processors operably connected to the interface and the memory for: acquiring a commentary and a candidate material resource set corresponding to the commentary, a candidate material resource being a video or an image; acquiring a matching degree between each paragraph in the commentary and each candidate material resource in the candidate material resource set; and determining a candidate material resource sequence corresponding to each paragraph in the commentary based on the matching degrees between paragraphs in the commentary and candidate material resources, playing durations of candidate material resources and text lengths of paragraphs in the commentary, an image playing duration being a preset image playing duration.

In yet another aspect, some embodiments of the present disclosure provide a computer readable storage medium, storing a computer program thereon, where the computer program, when executed by one or more processors, cause the one or more processors to: acquire a commentary and a candidate material resource set corresponding to the commentary, a candidate material resource being a video or an image; acquire a matching degree between each paragraph in the commentary and each candidate material resource in the candidate material resource set; and determine a candidate material resource sequence corresponding to each paragraph in the commentary based on the matching degrees between paragraphs in the commentary and candidate material resources, playing durations of candidate material resources and text lengths of paragraphs in the commentary, an image playing duration being a preset image playing duration.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for aligning a paragraph with a video, comprising:
    performing semantic segmentation on each video corresponding to a commentary, to obtain at least one video segment, the at least one video segment being determined as a target video set;
    merging the target video set and a target image set, to obtain a candidate material resource set corresponding to the commentary;
    acquiring a matching degree between each paragraph in the commentary and each candidate material resource in the candidate material resource set;
    determining, based on matching degrees between paragraphs in the commentary and candidate material resources and text lengths of the paragraphs in the commentary, a candidate material resource sequence corresponding to the each paragraph in the commentary according to a constraint condition that a playing duration of the sequence is equal to a playing duration of the paragraph or paragraphs, wherein a playing duration of an image is a preset image playing duration;
    for each paragraph in the commentary, generating an audio corresponding to the paragraph using a speech synthesis technology;

generating a video corresponding to the commentary based on audios corresponding to the paragraphs in the commentary and candidate material resource sequences; and sending the video corresponding to the commentary to a terminal device, such that the terminal device presents the video;

wherein generating the video corresponding to the commentary comprises:

for each paragraph in the commentary, inputting the paragraph into a pre-trained video pre-playing time determining model, to obtain a video pre-playing duration corresponding to the paragraph;

for each paragraph except for a last paragraph in the commentary, executing paragraph video clipping according to a front to rear order of paragraphs in the commentary;

sequentially connecting candidate material resources in the candidate material resource sequence corresponding to the last paragraph in the commentary, to obtain a video corresponding to the last paragraph;

connecting videos corresponding to the paragraphs according to the front to rear order of paragraphs in the commentary, to obtain a second video;

connecting the audios corresponding to the paragraphs according to the front to rear order of paragraphs in the commentary, to obtain a second audio; and determining the obtained second audio and second video for use as an audio part and a video part of the video corresponding to the commentary respectively.

2. The method according to claim 1, wherein the determining comprises:

for the each paragraph in the commentary, determining the candidate material resource sequence corresponding to the paragraph, with a playing duration of the candidate material resource sequence corresponding to the paragraph being equal to a playing duration corresponding to the paragraph as a constraint condition, and with maximizing a matching degree between the candidate material resource sequence corresponding to the paragraph and the paragraph as an optimization target.

3. The method according to claim 1, wherein the determining comprises:

determining candidate material resource sequences corresponding to the paragraphs in the commentary, with a playing duration of a candidate material resource sequence corresponding to a paragraph in the commentary being equal to the playing duration corresponding to the paragraph as a constraint condition, and with maximizing a sum of matching degrees between candidate material resource sequences corresponding to the paragraphs in the commentary and the corresponding paragraphs as an optimization target.

4. The method according to claim 3, wherein candidate material resources in the candidate material resource sequences corresponding to the paragraphs in the commentary are mutually different.

5. The method according to claim 2, wherein said determining the candidate material resource sequence corresponding to the paragraph is determined using a first preset optimization algorithm, and wherein the first preset optimization algorithm is a dynamic programming algorithm or a shortest path optimization algorithm.

6. The method according to claim 3, wherein said determining candidate material resource sequences corresponding to the paragraphs in the commentary is determined using a second preset optimization algorithm, and wherein the second preset optimization algorithm is a dynamic programming algorithm or a shortest path optimization algorithm.

7. An apparatus for aligning a paragraph with a video, comprising:

at least one processor; and a memory storing instructions, the instructions when executed by the at least one processor, cause the at least one processor to perform operations, the operations comprising:

performing semantic segmentation on each video corresponding to a commentary, to obtain at least one video segment, the at least one video segment being determined as a target video set;

merging the target video set and a target image set, to obtain a candidate material resource set corresponding to the commentary;

acquiring a matching degree between each paragraph in the commentary and each candidate material resource in the candidate material resource set;

determining, based on matching degrees between paragraphs in the commentary and candidate material resources and text lengths of the paragraphs in the commentary, a candidate material resource sequence corresponding to the each paragraph in the commentary according to a constraint condition that a playing duration of the sequence is equal to a playing duration of the paragraph or paragraphs, wherein a playing duration of an image is a preset image playing duration;

for each paragraph in the commentary, generating an audio corresponding to the paragraph using a speech synthesis technology;

generating a video corresponding to the commentary based on audios corresponding to the paragraphs in the commentary and candidate material resource sequences; and sending the video corresponding to the commentary to a terminal device, such that the terminal device presents the video;

wherein generating the video corresponding to the commentary comprises:

for each paragraph in the commentary, inputting the paragraph into a pre-trained video pre-playing time determining model, to obtain a video pre-playing duration corresponding to the paragraph;

for each paragraph except for a last paragraph in the commentary, executing paragraph video clipping according to a front to rear order of paragraphs in the commentary;

sequentially connecting candidate material resources in the candidate material resource sequence corresponding to the last paragraph in the commentary, to obtain a video corresponding to the last paragraph;

connecting videos corresponding to the paragraphs according to the front to rear order of paragraphs in the commentary, to obtain a second video;

connecting the audios corresponding to the paragraphs according to the front to rear order of paragraphs in the commentary, to obtain a second audio; and determining the obtained second audio and second video for use as an audio part and a video part of the video corresponding to the commentary respectively.

8. The apparatus according to claim 7, wherein the determining comprises:

for the each paragraph in the commentary, determining the candidate material resource sequence corresponding to the paragraph, with a playing duration of the candidate material resource sequence corresponding to the paragraph being equal to a playing duration corresponding to the paragraph as a constraint condition, and with maximizing a matching degree between the candidate material resource sequence corresponding to the paragraph and the paragraph as an optimization target.

9. The apparatus according to claim 7, wherein the determining comprises:
determining candidate material resource sequences corresponding to the paragraphs in the commentary, with a playing duration of a candidate material resource sequence corresponding to a paragraph in the commentary being equal to the playing duration corresponding to the paragraph as a constraint condition, and with maximizing a sum of matching degrees between candidate material resource sequences corresponding to the paragraphs in the commentary and the corresponding paragraphs as an optimization target.

10. The apparatus according to claim 9, wherein candidate material resources in the candidate material resource sequences corresponding to the paragraphs in the commentary are mutually different.

11. The apparatus according to claim 8, wherein said determining the candidate material resource sequence corresponding to the paragraph is determined using a first preset optimization algorithm, and wherein the first preset optimization algorithm is a dynamic programming algorithm or a shortest path optimization algorithm.

12. The apparatus according to claim 9, wherein said determining candidate material resource sequences corresponding to the paragraphs in the commentary is determined using a second preset optimization algorithm, and wherein the second preset optimization algorithm is a dynamic programming algorithm or a shortest path optimization algorithm.

13. A non-transitory computer readable storage medium, storing a computer program thereon, wherein the computer program, when executed by one or more processors, implements operations, the operations include:
performing semantic segmentation on each video corresponding to a commentary, to obtain at least one video segment, the at least one video segment being determined as a target video set;
merging the target video set and a target image set, to obtain a candidate material resource set corresponding to the commentary;
acquiring a matching degree between each paragraph in the commentary and each candidate material resource in the candidate material resource set;
determining, based on matching degrees between paragraphs in the commentary and candidate material resources and text lengths of the paragraphs in the commentary, a candidate material resource sequence corresponding to the each paragraph in the commentary according to a constraint condition that a playing duration of the sequence is equal to a playing duration of the paragraph or paragraphs, wherein a playing duration of an image is a preset image playing duration;
for each paragraph in the commentary, generating an audio corresponding to the paragraph using a speech synthesis technology;
generating a video corresponding to the commentary based on audios corresponding to the paragraphs in the commentary and candidate material resource sequences; and
sending the video corresponding to the commentary to a terminal device, such that the terminal device presents the video;
wherein generating the video corresponding to the commentary comprises:
for each paragraph in the commentary, inputting the paragraph into a pre-trained video pre-playing time determining model, to obtain a video pre-playing duration corresponding to the paragraph;
for each paragraph except for a last paragraph in the commentary, executing paragraph video clipping according to a front to rear order of paragraphs in the commentary;
sequentially connecting candidate material resources in the candidate material resource sequence corresponding to the last paragraph in the commentary, to obtain a video corresponding to the last paragraph;
connecting videos corresponding to the paragraphs according to the front to rear order of paragraphs in the commentary, to obtain a second video;
connecting the audios corresponding to the paragraphs according to the front to rear order of paragraphs in the commentary, to obtain a second audio; and
determining the obtained second audio and second video for use as an audio part and a video part of the video corresponding to the commentary respectively.

14. The medium according to claim 13, wherein the determining comprises:
for the each paragraph in the commentary, determining the candidate material resource sequence corresponding to the paragraph, with a playing duration of the candidate material resource sequence corresponding to the paragraph being equal to a playing duration corresponding to the paragraph as a constraint condition, and with maximizing a matching degree between the candidate material resource sequence corresponding to the paragraph and the paragraph as an optimization target.

* * * * *